(12) United States Patent
Wang et al.

(10) Patent No.: US 9,579,798 B2
(45) Date of Patent: Feb. 28, 2017

(54) HUMAN COLLABORATIVE ROBOT SYSTEM

(71) Applicant: FANUC Corporation, Yamanashi (JP)

(72) Inventors: Yuelai Wang, Yamanashi (JP); Yasuhiro Naitou, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/855,739

(22) Filed: Sep. 16, 2015

(65) Prior Publication Data

US 2016/0089790 A1  Mar. 31, 2016

(30) Foreign Application Priority Data

Sep. 25, 2014 (JP) ................. 2014-195143

(51) Int. Cl.
*G05B 19/18* (2006.01)
*B25J 9/16* (2006.01)

(52) U.S. Cl.
CPC ........... *B25J 9/1676* (2013.01); *B25J 9/1694* (2013.01); *Y10S 901/09* (2013.01)

(58) Field of Classification Search
CPC ...... B25J 13/085; B25J 9/1674; B25J 9/1694; B25J 9/1633; B25J 19/063; G05B 2219/39058; G05B 2219/40201; G05B 2219/40599; G05B 2219/45064; Y10S 901/02; Y10S 901/46; Y10S 901/09; G01L 5/0076

USPC ...... 700/245, 255, 258, 260, 261; 901/8, 33, 901/34

See application file for complete search history.

(56) References Cited

U.S. PATENT DOCUMENTS

| 6,473,672 B1 * | 10/2002 | Holdgreve ........ H01L 21/67265 700/178 |
| 2008/0190224 A1 * | 8/2008 | Song ..................... B25J 19/063 74/40 |
| 2009/0233720 A1 * | 9/2009 | Shim ................... B25J 17/0208 464/38 |

(Continued)

FOREIGN PATENT DOCUMENTS

| JP | 11-70490 A | 3/1999 |
| JP | 2003-25272 A | 1/2003 |

(Continued)

*Primary Examiner* — Khoi Tran
*Assistant Examiner* — Jorge Peche
(74) *Attorney, Agent, or Firm* — Hauptman Ham, LLP

(57) ABSTRACT

A human-collaborative robot system includes a detection unit that directly or indirectly detects a physical quantity which is changed in response to contact force applied to a robot when the robot comes in contact with an external environment, and a stop command unit that compares the physical quantity detected by the detection unit with a first threshold value and a second threshold value greater than the first threshold value, stops the robot according to a predetermined stop method when the physical quantity is equal to or greater than the first threshold value and is smaller than the second threshold value, and stops the robot in a shorter period of time as compared with the predetermined stop method when the physical quantity is equal to or greater than the second threshold value.

12 Claims, 13 Drawing Sheets

(56) References Cited

U.S. PATENT DOCUMENTS

| | | | |
|---|---|---|---|
| 2010/0145515 A1* | 6/2010 | Nakanishi | B25J 9/1676 700/255 |
| 2011/0054680 A1* | 3/2011 | Nakata | B25J 9/1674 700/245 |
| 2011/0270443 A1* | 11/2011 | Kamiya | G05B 19/401 700/245 |
| 2012/0043831 A1* | 2/2012 | Sakakibara | B25J 9/1674 307/326 |
| 2013/0073084 A1* | 3/2013 | Ooga | B25J 9/1633 700/254 |
| 2013/0184869 A1* | 7/2013 | Inazumi | B25J 9/1633 700/260 |
| 2014/0316573 A1* | 10/2014 | Iwatake | B25J 9/1694 700/258 |
| 2015/0127158 A1* | 5/2015 | Shimodaira | G05B 19/401 700/258 |
| 2015/0231787 A1* | 8/2015 | Inazumi | B25J 9/1633 700/260 |
| 2015/0314445 A1* | 11/2015 | Naitou | B25J 9/1674 700/258 |
| 2015/0328771 A1* | 11/2015 | Yuelai | B25J 9/1612 414/730 |
| 2015/0367510 A1* | 12/2015 | Naitou | B25J 9/1633 700/253 |
| 2016/0031086 A1* | 2/2016 | Tanabe | B25J 9/1694 700/246 |
| 2016/0176052 A1* | 6/2016 | Yamamoto | B25J 9/1676 700/255 |
| 2016/0200352 A1* | 7/2016 | Kezobo | B62D 5/049 180/446 |
| 2016/0207197 A1* | 7/2016 | Takahashi | B25J 9/1674 |
| 2016/0243700 A1* | 8/2016 | Naitou | B25J 9/1633 |
| 2016/0243705 A1* | 8/2016 | Naitou | G01L 5/009 |
| 2016/0257003 A1* | 9/2016 | Oyama | B25J 9/1676 |

FOREIGN PATENT DOCUMENTS

| | | |
|---|---|---|
| JP | 2010-137312 A | 6/2010 |
| JP | 2010-188504 A | 9/2010 |
| JP | 2012-040626 A | 3/2012 |
| JP | 2013-133192 A | 7/2013 |

\* cited by examiner

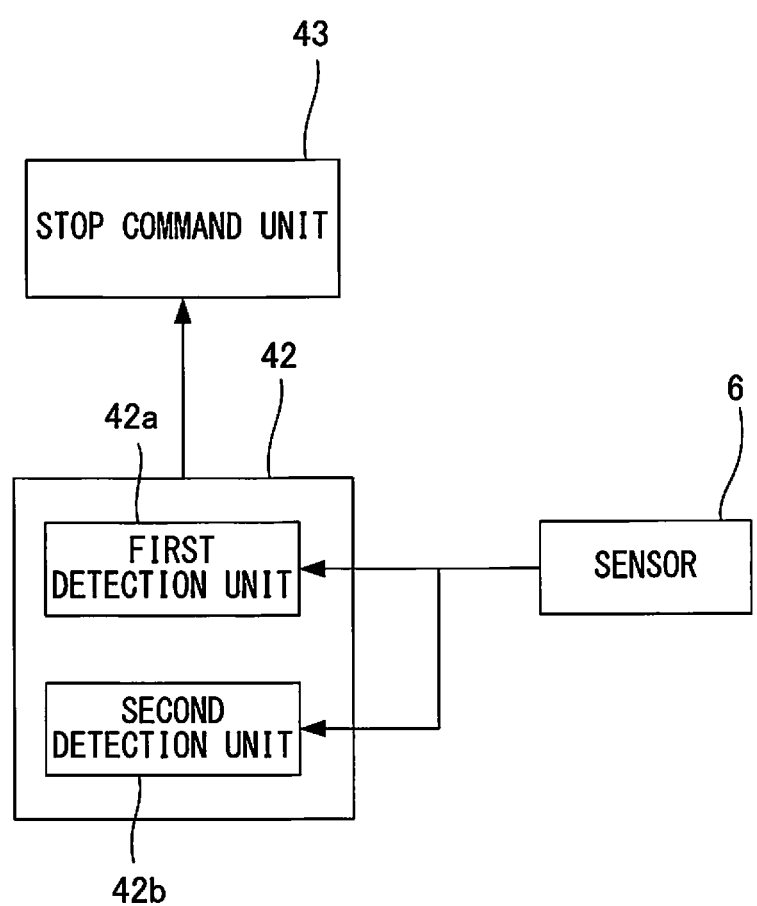

HUMAN COLLABORATIVE ROBOT SYSTEM

RELATED APPLICATIONS

The present application claims priority to Japanese Application Number 2014-195143, filed Sep. 25, 2014, the disclosure of which is hereby incorporated by reference herein in its entirety.

BACKGROUND OF THE INVENTION

1. Field of the Invention

The present invention relates to a human-collaborative robot system in which a robot and a human share a working space.

2. Description of the Related Art

In contrast to a conventional robot that operates in a working space separated from a working space of a human by a safety fence, in recent years, a human-collaborative robot in which a robot and a human share a working space has been spread. In the human-collaborative robot, it is necessary to ensure safety in order to prevent an injury to a human.

Japanese Laid-open Patent Publication No. 2012-040626A discloses a human-collaborative robot system in which when a detection value of a force sensor installed in a robot or a device mounted in the robot has exceeded a predetermined value, the robot is stopped or a motion of the robot is controlled so as to decrease the detection value of the force sensor.

Japanese Laid-open Patent Publication No. 2010-137312A discloses a robot system which is provided with a collision detection device that detects a collision of a robot arm with an obstacle, and is configured to selectively perform an appropriate stop method such that mechanical damage of a robot and the obstacle is minimally restrained on the basis of information from the collision detection device. In detail, according to the known art, on the basis of information of a relation between a rotation direction of a servo motor and a direction of collision torque, a rotation speed of the servo motor, and the like, a robot is stopped according to one of a sudden stop process, a slow stop process, and an all-axis pullback process.

However, in the known art disclosed in Japanese Laid-open Patent Publication No. 2012-040626A, when a contact between the robot and the human has been detected, the robot always performs a predetermined operation. Therefore, for example, a worker having made contact with the robot may feel threatened by the robot that suddenly stops, and his or her work is disturbed even if there is little risk in fact. In the known art disclosed in Japanese Laid-open Patent Publication No. 2010-137312A in which various stop processes are selectively performed, it is not expected that the robot is stopped in a manner in which a worker having made contact with a robot feels a sense of safety.

In this regard, there is a need for a human-collaborative robot system configured to slowly stop a robot so as to give a sense of safety to a human while ensuring the safety of the robot and a surrounding environment of the robot.

SUMMARY OF THE INVENTION

According to a first aspect of the invention, there is provided a human-collaborative robot system in which a robot and a human share a working space, comprising: a detection unit configured to directly or indirectly detect a physical quantity which is changed in response to contact force applied to the robot when the robot comes in contact with an external environment; and a stop command unit configured to compare the physical quantity detected by the detection unit with a first threshold value and a second threshold value greater than the first threshold value, stop the robot according to a predetermined stop method when the physical quantity is equal to or greater than the first threshold value and is smaller than the second threshold value, and stop the robot in a shorter period of time as compared with the predetermined stop method when the physical quantity is equal to or greater than the second threshold value.

According to a second aspect of the invention, in the human-collaborative robot system according to the first aspect, the physical quantity is force or torque applied to the robot from the external environment.

According to a third aspect of the invention, in the human-cooperative robot system according to the first aspect, the physical quantity is a differential value of force or torque applied to the robot from the external environment with respect to time.

According to a fourth aspect of the invention, in the human-collaborative robot system according to the first aspect, the physical quantity is an amplitude of vibration of force or of torque at a certain frequency applied from the external environment.

According to a fifth aspect of the invention, there is provided a human-collaborative robot system in which a robot and a human share a working space, comprising: a first detection unit configured to directly or indirectly detect a first physical quantity which is changed in response to contact force applied to the robot when the robot comes in contact with an external environment; a second detection unit configured to directly or indirectly detect a second physical quantity which is changed in response to the contact force applied to the robot when the robot comes in contact with the external environment; and a stop command unit configured to compare the first physical quantity detected by the first detection unit with a first threshold value, compare the second physical quantity detected by the second detection unit with a third threshold value, stop the robot according to a predetermined stop method when the first physical quantity is equal to or greater than the first threshold value and the second physical quantity is smaller than the third threshold value, and stop the robot in a shorter period of time as compared with the predetermined stop method when the first physical quantity is equal to or greater than the first threshold value and the second physical quantity is equal to or greater than the third threshold value.

According to a sixth aspect of the invention, in the human-collaborative robot system according to the fifth aspect, the first physical quantity is force or torque applied to the robot from the external environment, and the second physical quantity is a differential value of force or torque applied to the robot from the external environment with respect to time.

According to a seventh aspect of the invention, in the human-collaborative robot system according to the fifth aspect, the first physical quantity is force or torque applied to the robot from the external environment, and the second physical quantity is an amplitude of vibration of force or torque at a certain frequency applied from the external environment.

According to an eighth aspect of the invention, in the human-collaborative robot system according to the fifth aspect, the first physical quantity is force or torque applied to the robot from the external environment, and the second physical quantity is a speed of the robot.

According to a ninth aspect of the invention, in the human-collaborative robot system according to the fifth aspect, the first physical quantity is a differential value of force or torque applied to the robot from the external environment with respect to time, and the second physical quantity is force or torque applied to the robot from the external environment.

According to a tenth aspect of the invention, in the human-collaborative robot system according to the fifth aspect, the first physical quantity is a differential value of force or torque applied to the robot from the external environment with respect to time, and the second physical quantity is a speed of the robot.

According to an eleventh aspect of the invention, in the human-collaborative robot system according to the fifth aspect, the first physical quantity is an amplitude of vibration of force or torque at a certain frequency applied from the external environment, and the second physical quantity is force or torque applied to the robot from the external environment.

According to a twelfth aspect of the invention, in the human-collaborative robot system according to the fifth aspect, the first physical quantity is an amplitude of vibration of force or torque at a certain frequency applied from the external environment, and the second physical quantity is a speed of the robot.

These and other objects, features and advantages of the present invention will become more apparent in light of the detailed description of exemplary embodiments thereof as illustrated in the drawings.

BRIEF DESCRIPTION OF THE DRAWINGS

FIG. 6 is a functional block diagram illustrating a configuration of a detection unit in a human-collaborative robot system according to a second embodiment.

DETAILED DESCRIPTION

Figure 1:
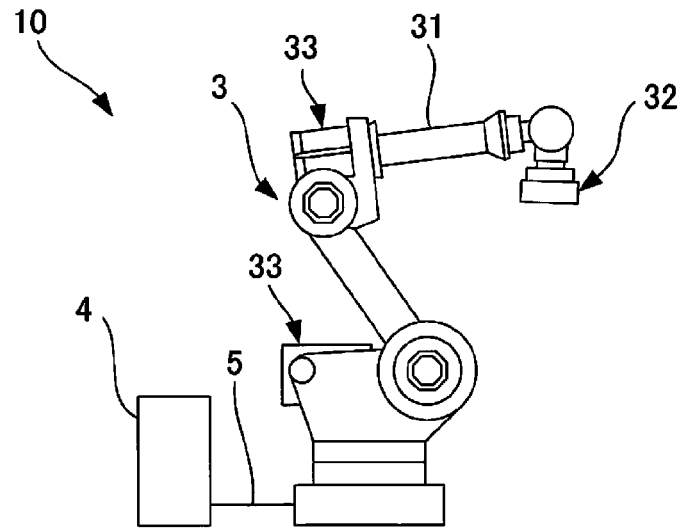
FIG. 1 is a diagram illustrating an exemplary configuration of a robot used in a human-collaborative robot system according to the present invention.

Hereinafter, embodiments of the present invention will be described with reference to the accompanying drawings. Scales of the illustrated elements are changed as necessary in order to facilitate the understanding of the present invention. Furthermore, the same reference numerals are used to designate the same elements or corresponding elements.

FIG. 1 is a diagram illustrating an exemplary configuration of a human-collaborative robot system (hereinafter, simply referred to as "the robot system") according to the present invention. The robot system 10 is designed such that a robot 3 and a human share a common working space. The robot 3, for example, is a six-axis vertical articulated robot as illustrated in the drawing. However, the robot 3 may also be a known robot having any other configurations. The robot 3 is operated by servo motors 33 (only some of them are illustrated) provided at each joint, so as to have desired positions and postures. Each servo motor 33 of the robot 3 is driven according to a control command transmitted from a control device 4 through a known communication means such as a communication cable 5.

The robot 3 is configured to perform desired work using an end effector (not illustrated) mounted on a wrist 32 at a tip end of an arm 31. The end effector is an external device exchangeable according to the purposes, which may, for example, include a hand for grasping an object, a welding gun, a tool or the like.

The robot 3 includes various sensors (not illustrated) that detect operating states of the robot 3. The sensors, for example, may include a force sensor that detects an external force acting on the robot 3, a torque sensor that detects a torque acting on each joint of the robot 3, an accelerometer that detects an acceleration of the robot 3, an encoder that detects a rotational position of the servo motor 33, and other three-dimensional measuring device, but are not limited thereto. Various sensors may be embedded inside the robot 3 or may also be mounted outside the body of the robot 3.

Figure 2:
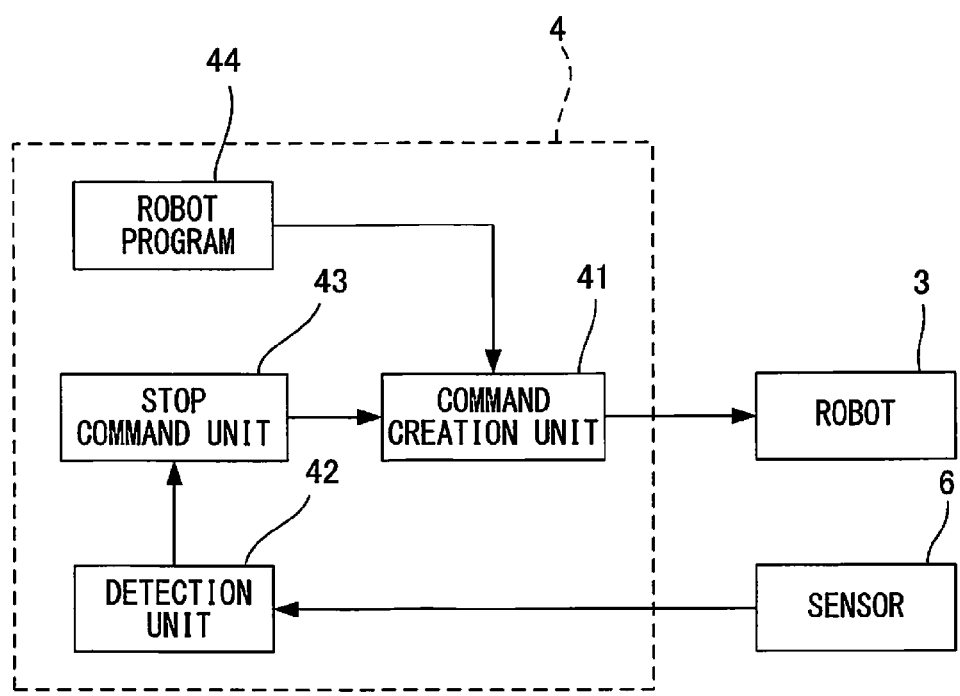
FIG. 2 is a functional block diagram of a human-collaborative robot system according to a first embodiment.

The control device 4 is a digital computer having a hardware configuration which includes CPU, RAM, ROM, an interface which transmits/receives signals and data to/from an external device such as a display device and an input device. FIG. 2 is a functional block diagram of the robot system 10 according to one embodiment. As illustrated in FIG. 2, the control device 4 includes a command creation unit 41, a detection unit 42, and a stop command unit 43.

The command creation unit 41 creates a control command for the robot 3. The control command is created, for example, to make the robot 3 perform predetermined work according to a robot program 44 stored in the ROM. Furthermore, the command creation unit 41 creates a stop command for safely stopping the robot 3 in response to a signal transmitted from the stop command unit 43 which will be described below.

The detection unit 42 detects physical quantities associated with operating states of the robot 3 in cooperation with various sensors 6 provided in the robot 3. The physical quantities detected by the detection unit 42 change, depending on a contact force which is generated when the robot 3 comes in contact with an external environment (for example, an object or a worker around the robot 3). The physical quantities detected by the detection unit 42 increase or decrease, depending on the magnitude of the contact force applied to the robot 3, and for example, may include an external force (force or torque) acting on the robot 3, a differential value of the external force with respect to time, the amplitude of vibration of the external force, a speed of the robot 3, and the like. The detection unit 42 directly acquires these physical quantities from detection values of the sensors 6 or indirectly acquires them by calculation on the basis of the detection values of the sensors 6.

The stop command unit 43 compares a predetermined kind of physical quantities detected by the detection unit 42 with a predetermined threshold value, and determines whether or not a quick stop of the robot 3 should be performed or whether or not a slow stop should be performed, on the basis of a result of the comparison. The "quick stop" corresponds to a process of stopping the robot 3 as quickly as possible. On the other hand, the "slow stop" corresponds to a process of slowly stopping the robot 3 over a longer period of time as compared with the sudden stop. When performing the slow stop, the control device 4 functions, for example, to limit a deceleration to be equal to or less than a predetermined value, or retract the robot 3 in a direction in which the contact force acting between the robot 3 and the external environment can be reduced, thereby slowly stopping the robot 3.

According to one embodiment, when the physical quantity detected by the detection unit 42 is equal to or greater than a first threshold value Th1 and is smaller than a second threshold value Th2, the stop command unit 43 transmits a predetermined signal to the command creation unit 41 such that the robot 3 is slowly stopped. When the physical quantity is equal to or greater than the second threshold value Th2, the stop command unit 43 transmits a corresponding signal to the command creation unit 41 such that the quick stop of the robot 3 is performed. When the physical quantity is smaller than the first threshold value Th1, it is assumed that there is no contact between the robot 3 and the external environment. In this case, no signal is transmitted from the stop command unit 43 to the command creation unit 41, and the robot 3 continues predetermined work according to the content of the robot program 44.

In the robot system 10 according to the aforementioned embodiment, the stop operation of the robot 3 is selectively performed, depending on the magnitude of the detected physical quantity. Accordingly, when danger caused by the contact is severe, the robot 3 is quickly stopped, thereby ensuring the safety of the robot and a worker. On the other hand, when the danger caused by the contact is less severe, the robot 3 is slowly stopped, thereby giving a sense of safety to the worker. This ensures the safety in a working environment for the robot and the external environment, while allowing the worker to feel safe in the working environment.

With reference to FIG. 3, FIG. 4, FIG. 5A, FIG. 5B, and FIG. 6, the selection of a stop method of the robot 3 by the stop command unit 43 in the robot system 10 according to a first embodiment will be described.

Figure 3:
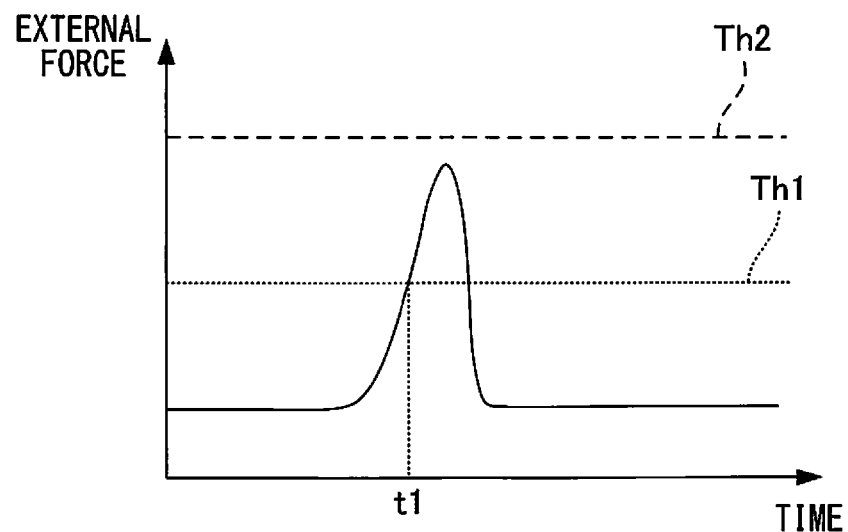
FIG. 3 is a graph illustrating an example when a physical quantity detected by a detection unit is external force.

FIG. 3 is a graph illustrating an example when the physical quantity detected by the detection unit 42 is an external force (force or torque) acting on the robot 3. The external force acting on the robot 3 is detected, for example, by a force sensor provided in the wrist 32 of the robot 3 or the body of the robot 3 such as a base (a non-movable part fixed to a floor) of the robot 3, or a torque sensor provided at a joint of the robot 3, and the like. The external force detected by the detection unit 42 is a counteracting force applied to the robot 3 as a result of the robot 3 coming in contact with an external environment. Therefore, as the external force detected by the detection unit 42 increases, it can be assumed that the danger to the external environment, such as a worker, increases.

In the graph of FIG. 3, a horizontal axis indicates time and a vertical axis indicates the external force. In the graph, a dotted line indicates the first threshold value Th1 and a dashed line indicates the second threshold value Th2. In the illustrated example, at time t1, the external force detected by the detection unit 42 reaches the first threshold value Th1. Therefore, given the assumption that the robot 3 comes in contact with an external environment at time t1, the stop command unit 43 transmits a signal to the command creation unit 41 so as to slowly stop the robot 3.

In the illustrated example, since the robot 3 is slowly stopped, the robot 3 can be stopped while the external force does not exceed the second threshold value Th2. On the other hand, in the case where the external force reaches the second threshold value Th2 or more despite the slow stop of the robot 3, the stop command unit 43 transmits a signal to the command creation unit 41 such that the robot 3 is quickly stopped. It should be noted that in the case where more than one force sensor or torque sensor are employed, the stop process of the robot 3 is performed when a contact between the robot and the external environment is detected by any one of the sensors.

Figure 4:
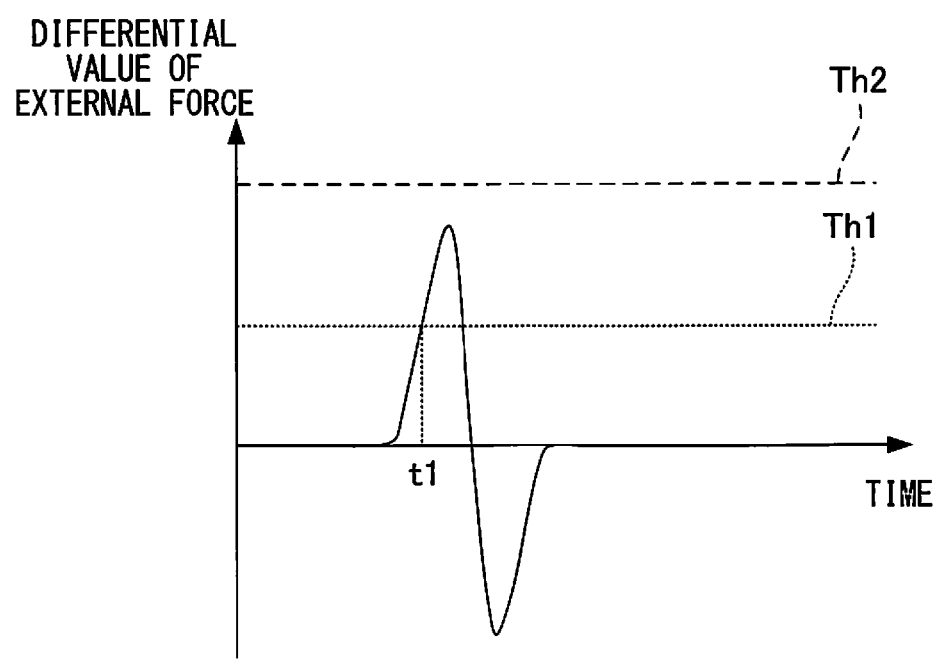
FIG. 4 is a graph illustrating an example when a physical quantity detected by a detection unit is a differential value of external force.

FIG. 4 is a graph illustrating an example when the physical quantity detected by the detection unit 42 is a differential value of external force (force or torque) acting on the robot 3 with respect to time. In the graph of FIG. 4, a horizontal axis indicates time and a vertical axis indicates the differential value of the external force. In this case, the detection unit 42 calculates the differential value of the external force on the basis of the external force acting on the robot 3, which is detected by the sensor 6. The differential value of the external force has a correlation with the magnitude of contact force when the robot 3 comes in contact with an external environment. For example, when the external environment with which the robot 3 comes in contact is a flexible object (for example, a human body), part of the force is absorbed as a result of a deformation of the object. This leads to a decrease in a change amount of the external force, or in other words, the differential value of the external force is smaller. On the other hand, when the object is made of a material with high rigidity, since the object is not deformed when coming in contact with the robot 3, a change amount of the external force, i.e. the differential value of the external force is greater. Accordingly, it can be said that as the differential value of the external force increases, the danger due to a contact between the robot 3 and the external environment increases.

In the graph of FIG. 4, a dotted line indicates the first threshold value Th1 and a dashed line indicates the second threshold value Th2. In the illustrated example, at a time t1, the differential value of the external force detected by the detection unit 42 is equal to or greater than the first threshold value Th1. Therefore, the stop command unit 43 transmits a signal to the command creation unit 41 so as to slowly stop the robot 3, with the assumption that the robot 3 comes in contact with an external environment at time t1. On the other hand, in the case where the differential value of the external force has reached the second threshold value Th2 or more even though the slow stop has been performed, the stop command unit 43 transmits a signal to the command creation unit 41 to quickly stop the robot 3.

Figure 5A:
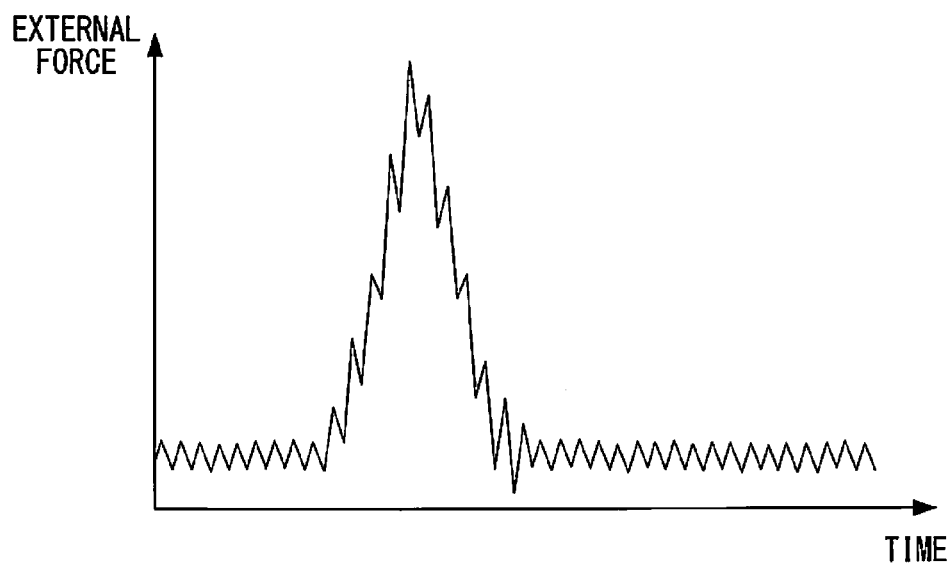
FIG. 5A is a graph illustrating an example of an external force detected by a detection unit.
Figure 5B:
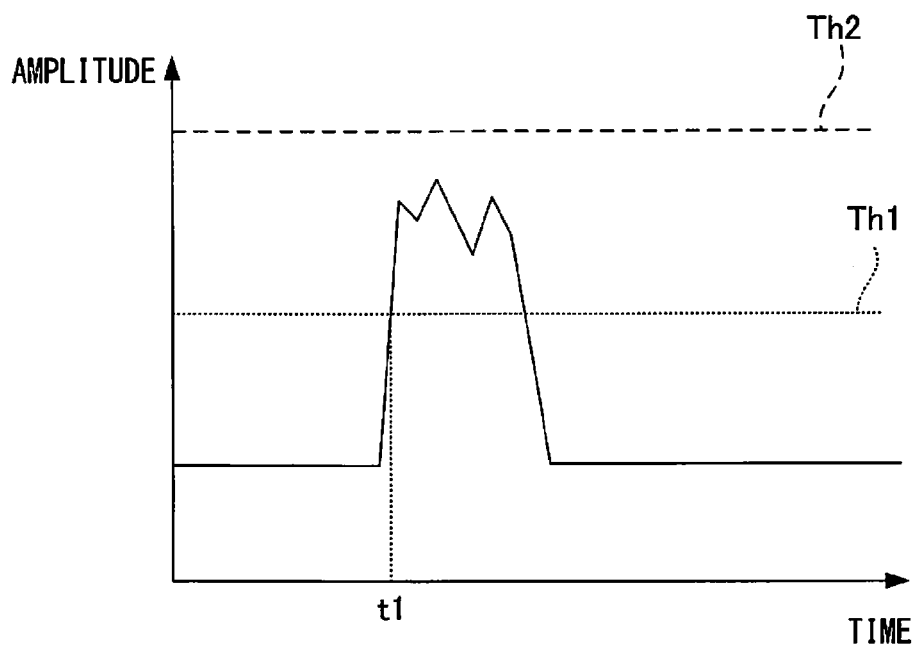
FIG. 5B is a graph illustrating an example when a physical quantity detected by a detection unit is an amplitude of vibration of external force.

FIG. 5A and FIG. 5B are graphs illustrating an example when the physical quantity detected by the detection unit 42 is the amplitude of vibration of external force acting on the robot 3. In FIG. 5A, a horizontal axis indicates time and a vertical axis indicates the external force. The external force illustrated in the graph of FIG. 5A includes noise and vibrates with a relatively small amplitude. When the robot 3 comes in contact with an external environment, vibration of the robot 3 increases. As a result, the amplitude of the vibration of the external force at a certain frequency is increased.

In the graph of FIG. 5B, a vertical axis indicates the amplitude of the vibration of the external force at a certain frequency, which is calculated from the external force shown in FIG. 5A. In other words, according to the present embodiment, the detection unit 42 calculates the amplitude of the vibration of the external force on the basis of the detection value of the external force from the sensor 6. At time t1 at which the amplitude of the vibration of the external force has reached the first threshold value Th1 or more, the stop command unit 43 transmits a signal to the command creation unit 41 so as to slowly stop the robot 3. In the case where the amplitude of the vibration of the external force has reached the second threshold value Th2 or more, the stop command unit 43 transmits a signal to the command creation unit 41 so as to quickly stop the robot 3, with the assumption that the danger due to a contact between the robot 3 and the external environment is severe.

FIG. 6 is a functional block diagram illustrating a configuration of a detection unit 42 in a robot system 10 according to a second embodiment. In the present embodiment, the robot system 10 controls the stop operation of the robot 3 on the basis of two types of different physical quantities (hereinafter, referred to as a "first physical quantity" and a "second physical quantity," respectively). The detection unit 42 includes a first detection unit 42a and a second detection unit 42b as illustrated in the drawing. The first detection unit 42a and the second detection unit 42b detect the first physical quantity and the second physical quantity, respectively. The first physical quantity and the second physical quantity are respectively changed in response to contact force when the robot 3 comes in contact with an external environment. The first physical quantity and the second physical quantity are different from each other, but may also be directly or indirectly acquired from the same sensor 6. Alternatively, the first physical quantity and the second physical quantity may also be acquired from separate sensors.

According to the present embodiment, when the first physical quantity detected by the first detection unit 42a is equal to or greater than the first threshold value Th1 and the second physical quantity detected by the second detection unit 42b is smaller than a third threshold value Th3, the stop command unit 43 transmits a predetermined signal to the command creation unit 41 so as to slowly stop the robot 3. Furthermore, when the first physical quantity is equal to or greater than the first threshold value Th1 and the second physical quantity is equal to or greater than the third threshold value Th3, the stop command unit 43 transmits a corresponding signal to the command creation unit 41 so as to quickly stop the robot 3. With reference to FIGS. 7A to 13B, exemplary application of the present embodiment will be described.

Figure 7A:
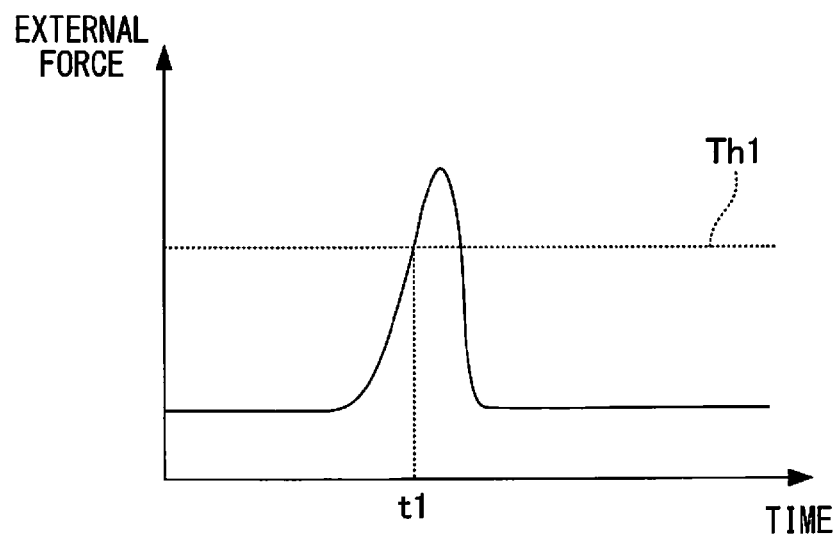
FIG. 7A is a graph illustrating an example when a first physical quantity detected by a detection unit is external force.
Figure 7B:
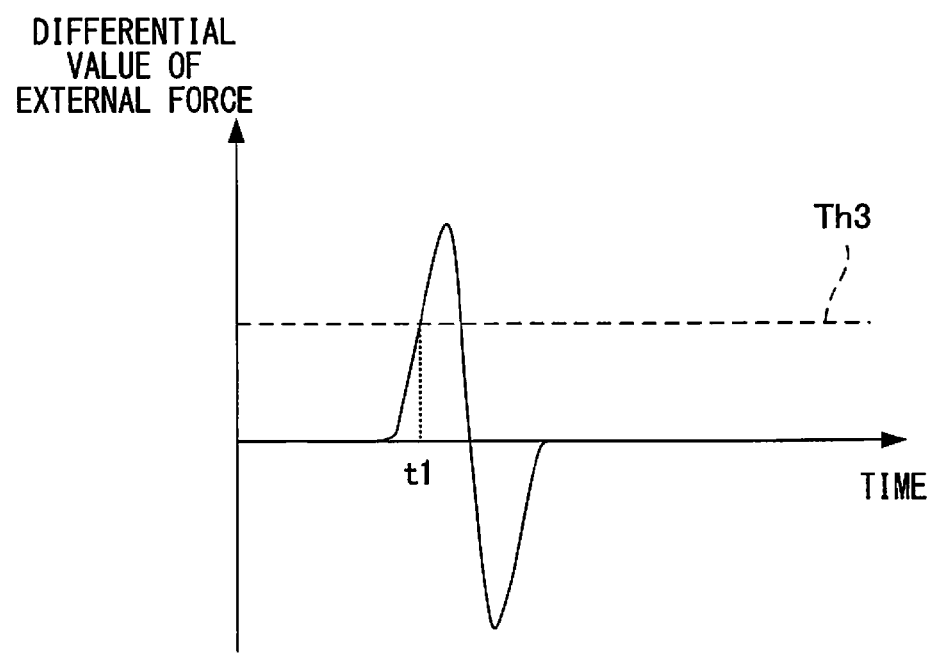
FIG. 7B is a graph illustrating an example when a second physical quantity detected by a detection unit is a differential value of external force.

FIG. 7A and FIG. 7B respectively illustrate an example in which the first physical quantity detected by the first detection unit 42a is external force acting on the robot 3 and the second physical quantity detected by the second detection unit 42b is a differential value of the external force. A vertical axis of the graph of FIG. 7A indicates the external force and a vertical axis of the graph of FIG. 7B indicates the differential value of the external force. As illustrated in FIG. 7A, the external force detected by the first detection unit 42a reaches the first threshold value Th1 at time t1. Consequently, the stop command unit 43 determines that the robot 3 comes in contact with an external environment at time t1. In this case, the stop command unit 43 compares the differential value of the external force with the third threshold value Th3 illustrated in FIG. 7B, and determines whether to slowly stop or quickly stop the robot 3.

In other words, when the external force is equal to or greater than the first threshold value Th1 and the differential value of the external force is smaller than the third threshold value Th3, the stop command unit 43 slowly stops the robot 3. When the external force is equal to or greater than the first threshold value Th1 and the differential value of the external force is equal to or greater than the third threshold value Th3, the stop command unit 43 quickly stops the robot 3

Figure 8A:
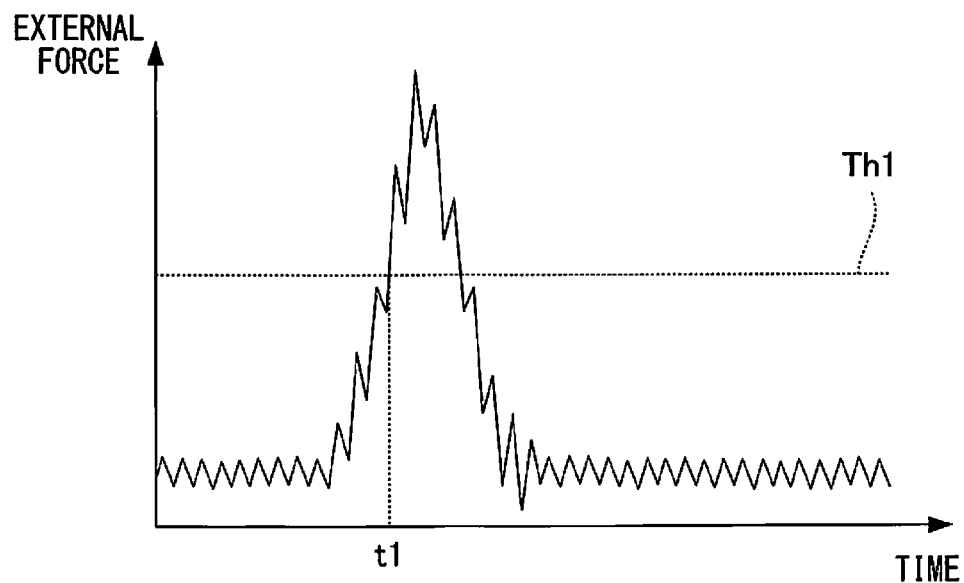
FIG. 8A is a graph illustrating an example when a first physical quantity detected by a detection unit is external force.
Figure 8B:
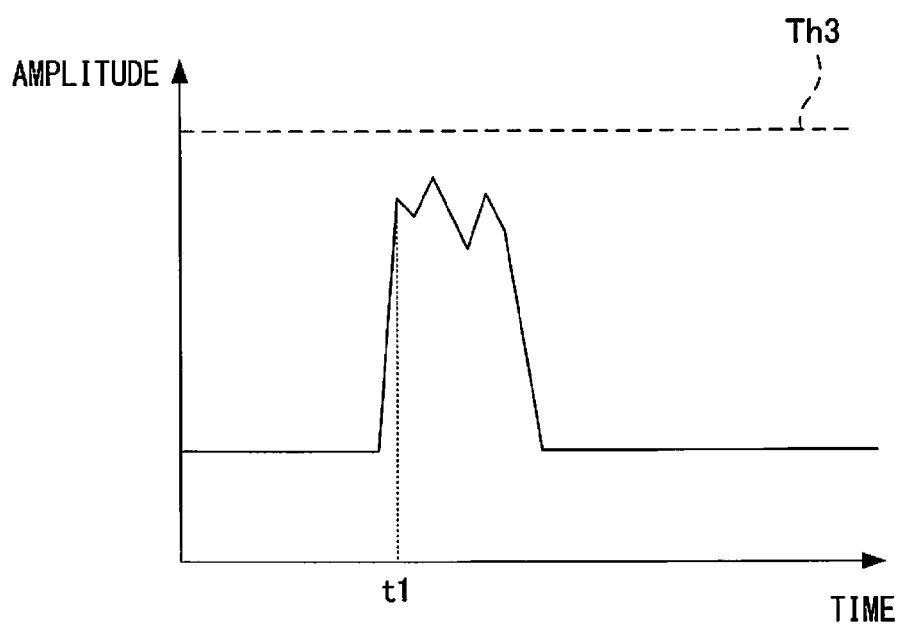
FIG. 8B is a graph illustrating an example when a second physical quantity detected by a detection unit is an amplitude of vibration of external force.

FIG. 8A and FIG. 8B respectively illustrate an example in which the first physical quantity detected by the first detection unit 42a is external force acting on the robot 3 and the second physical quantity detected by the second detection unit 42b is the amplitude of the vibration of the external force at a certain frequency. According to the present embodiment, when the external force is equal to or greater than the first threshold value Th1 and the amplitude of the vibration of the external force is smaller than the third threshold value Th3, the stop command unit 43 slowly stops the robot 3. When the external force is equal to or greater than the first threshold value Th1 and the amplitude of the vibration of the external force is equal to or greater than the third threshold value Th3, the stop command unit 43 quickly stops the robot 3. In the case of the illustrated example, referring to FIG. 8B, the amplitude of the vibration of the external force is smaller than the third threshold value Th3. Therefore, the stop command unit 43 transmits a corresponding signal to the command creation unit 41 so as to slowly stop the robot 3.

Figure 9A:
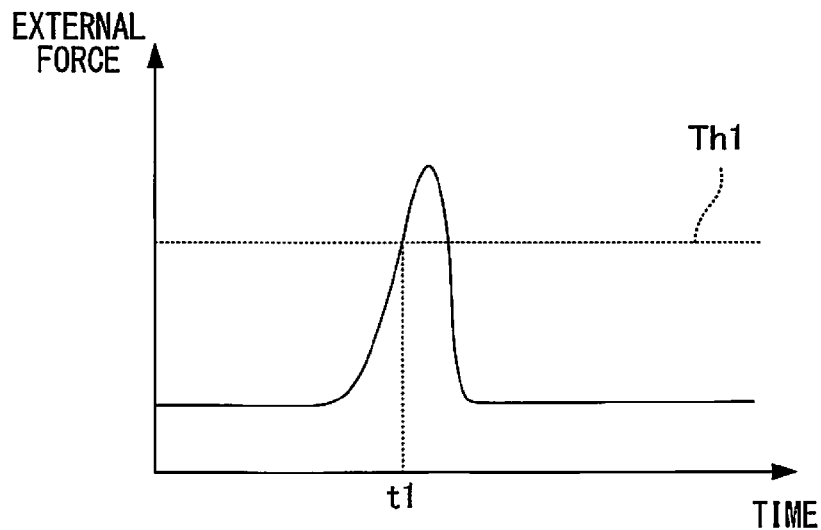
FIG. 9A is a graph illustrating an example when a first physical quantity detected by a detection unit is external force.
Figure 9B:
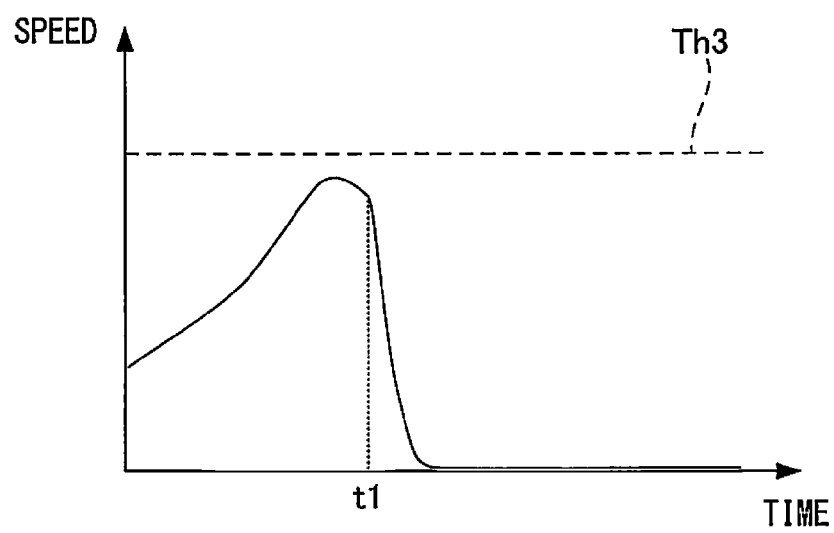
FIG. 9B is a graph illustrating an example when a second physical quantity detected by a detection unit is a speed of a robot.

FIG. 9A and FIG. 9B respectively illustrate an example in which the first physical quantity detected by the first detection unit 42a is external force acting on the robot 3 and the second physical quantity detected by the second detection unit 42b is a speed of the robot 3. When the robot 3 comes in contact with an external environment, an impact of the contact tends to be greater as the speed of the robot 3 increases. Accordingly, it can be assumed that the danger to the robot 3 and the external environment increases as the speed of the robot 3 increases. The speed of the robot 3 is obtained, for example, by calculation on the basis of a detection value of the accelerometer or a detection value of an encoder provided for each servo motor 33.

Specifically, according to the present embodiment, when the external force is equal to or greater than the first threshold value Th1 and the speed of the robot 3 is smaller than the third threshold value Th3, the stop command unit 43 slowly stops the robot 3. When the external force is equal to or greater than the first threshold value Th1 and the speed of the robot 3 is equal to or greater than the third threshold value Th3, the stop command unit 43 quickly stops the robot 3.

Figure 10A:
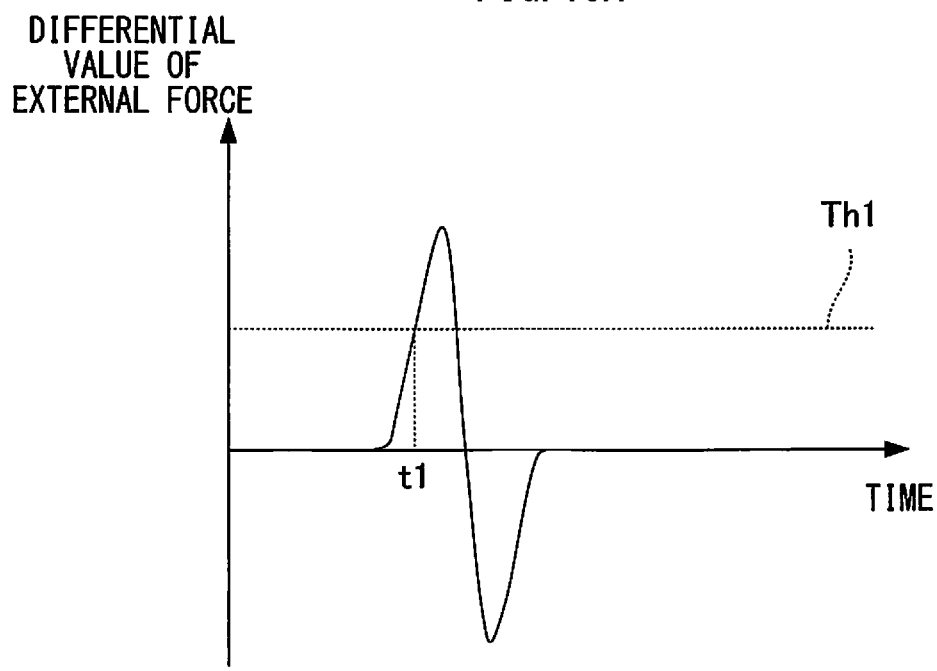
FIG. 10A is a graph illustrating an example when a first physical quantity detected by a detection unit is a differential value of external force.
Figure 10B:
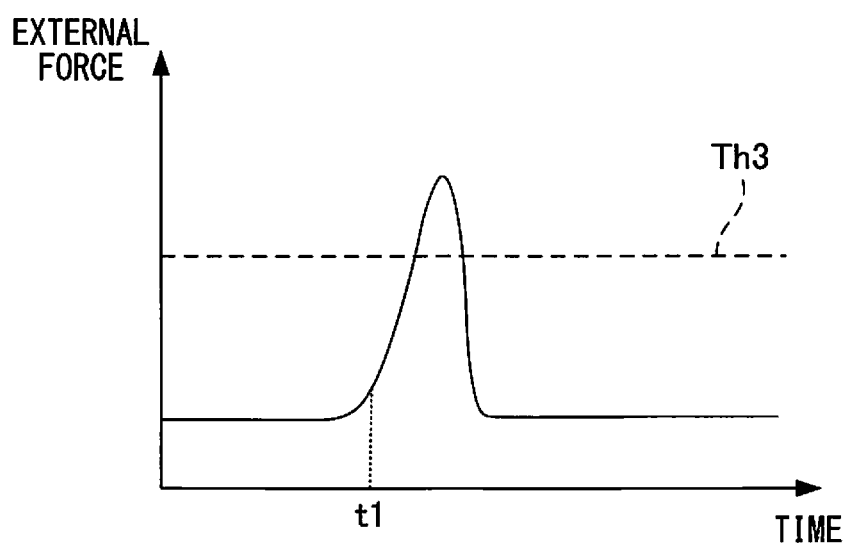
FIG. 10B is a graph illustrating an example when a second physical quantity detected by a detection unit is external force.

FIG. 10A and FIG. 10B respectively illustrate an example in which the first physical quantity detected by the first detection unit 42a is a differential value of external force acting on the robot 3 with respect to time and the second physical quantity detected by the second detection unit 42b is the external force acting on the robot 3. In this case, when the differential value of external force is equal to or greater than the first threshold value Th1 and the external force is smaller than the third threshold value Th3, the stop command unit 43 slowly stops the robot 3. When the differential value of external force is equal to or greater than the first threshold value Th1 and the external force is equal to or greater than the third threshold value Th3, the stop command unit 43 quickly stops the robot 3.

Figure 11A:
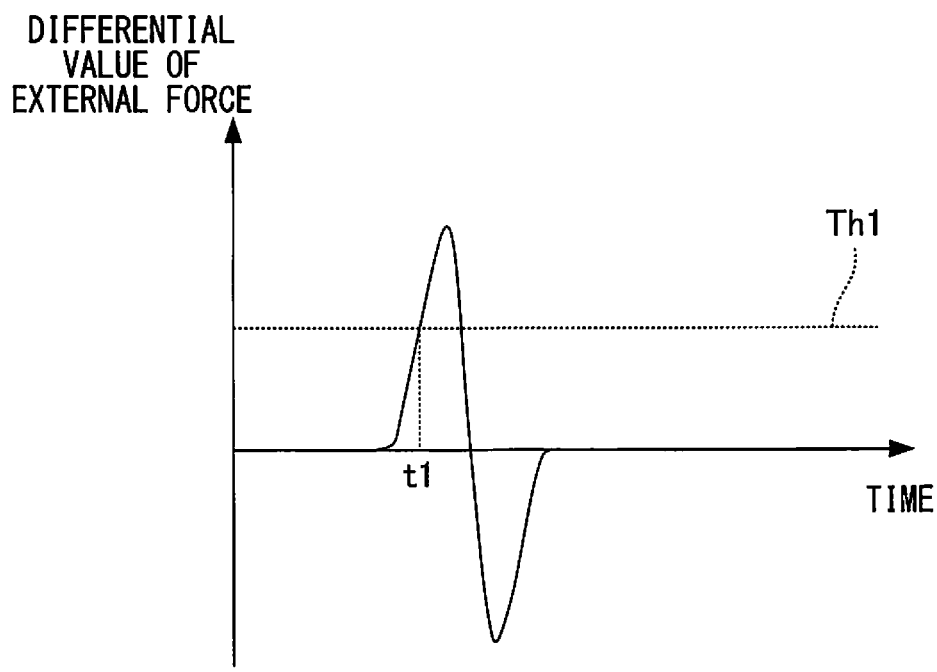
FIG. 11A is a graph illustrating an example when a first physical quantity detected by a detection unit is a differential value of external force.
Figure 11B:
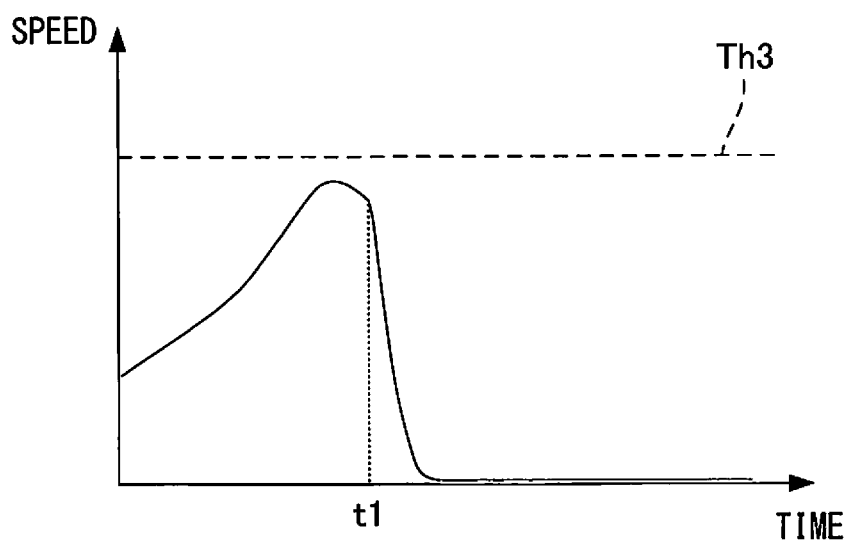
FIG. 11B is a graph illustrating an example when a second physical quantity detected by a detection unit is a speed of a robot.

FIG. 11A and FIG. 11B respectively illustrate an example in which the first physical quantity detected by the first detection unit 42a is a differential value of external force acting on the robot 3 with respect to time and the second physical quantity detected by the second detection unit 42b is the speed of the robot 3. In this case, when the differential value of external force is equal to or greater than the first threshold value Th1 and the speed of the robot 3 is smaller than the third threshold value Th3, the stop command unit 43 slowly stops the robot 3. When the differential value of external force is equal to or greater than the first threshold value Th1 and the speed of the robot 3 is equal to or greater than the third threshold value Th3, the stop command unit 43 quickly stops the robot 3.

Figure 12A:
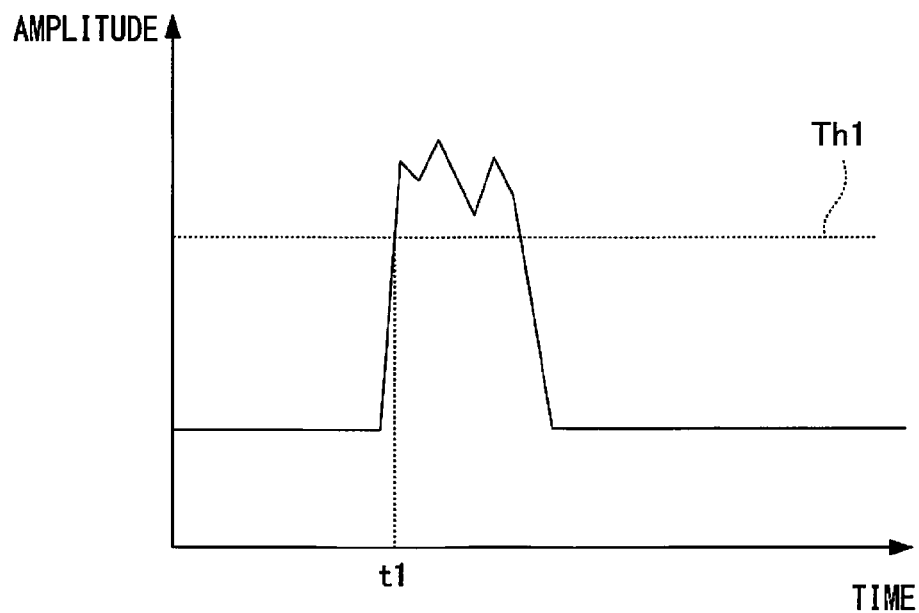
FIG. 12A is a graph illustrating an example when a first physical quantity detected by a detection unit is an amplitude of vibration of external force.
Figure 12B:
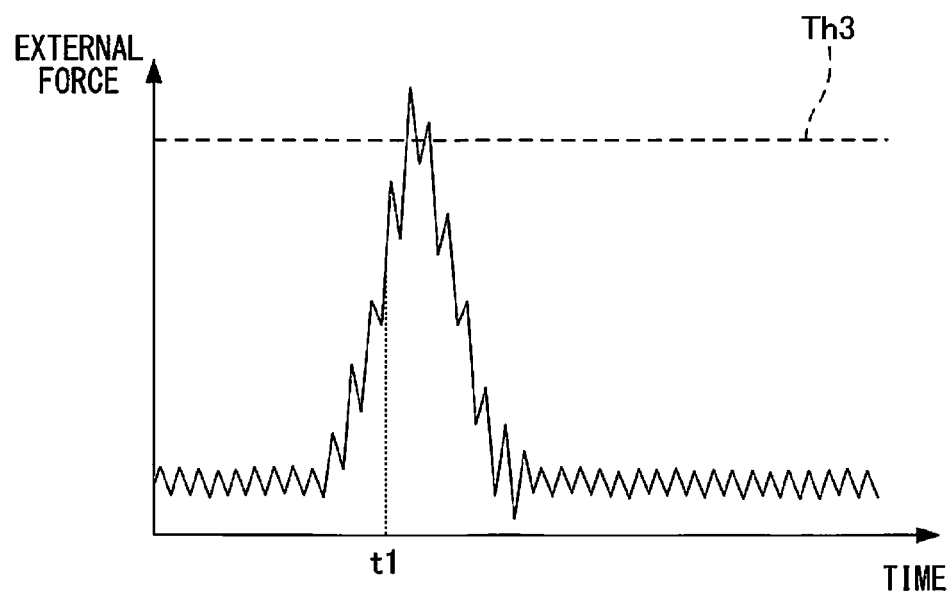
FIG. 12B is a graph illustrating an example when a second physical quantity detected by a detection unit is external force.

FIG. 12A and FIG. 12B respectively illustrate an example in which the first physical quantity detected by the first detection unit 42a is the amplitude of the vibration of the external force at a certain frequency and the second physical quantity detected by the second detection unit 42b is the external force acting on the robot 3. In this case, when the amplitude of the vibration of the external force is equal to or greater than the first threshold value Th1 and the external force is smaller than the third threshold value Th3, the stop command unit 43 slowly stops the robot 3. When the amplitude of the vibration of the external force is equal to or greater than the first threshold value Th1 and the external force is equal to or greater than the third threshold value Th3, the stop command unit 43 quickly stops the robot 3.

Figure 13A:
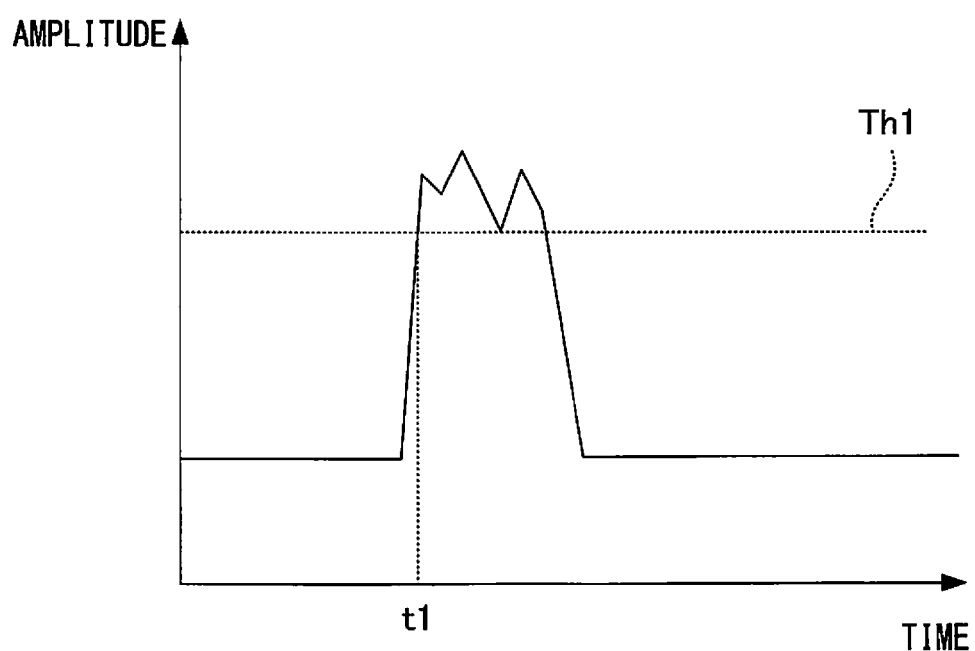
FIG. 13A is a graph illustrating an example when a first physical quantity detected by a detection unit is an amplitude of vibration of external force.
Figure 13B:
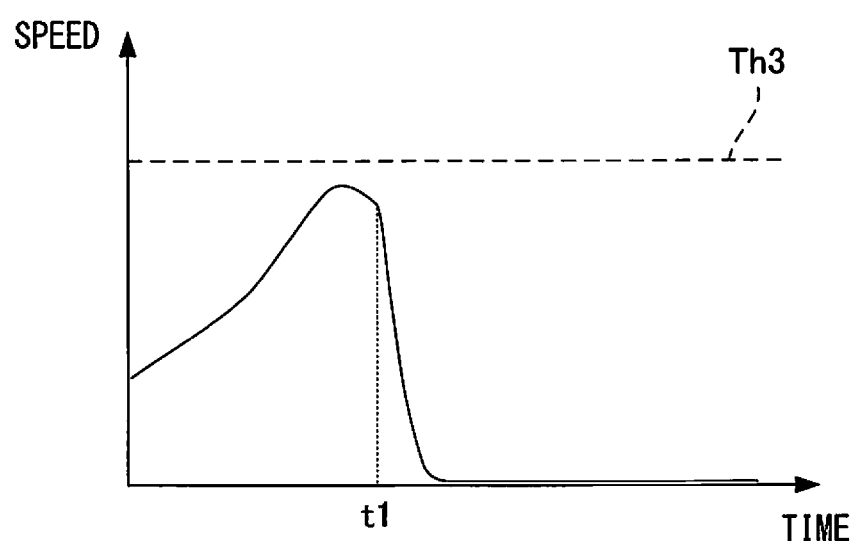
FIG. 13B is a graph illustrating an example when a second physical quantity detected by a detection unit is a speed of a robot.

FIG. 13A and FIG. 13B respectively illustrate an example in which the first physical quantity detected by the first detection unit 42a is the amplitude of the vibration of the external force at a certain frequency and the second physical quantity detected by the second detection unit 42b is the speed of the robot 3. In this case, when the amplitude of the vibration of the external force is equal to or greater than the first threshold value Th1 and the speed of the robot 3 is smaller than the third threshold value Th3, the stop command unit 43 slowly stops the robot 3. When the amplitude of the vibration of external force is equal to or greater than the first threshold value Th1 and the speed of the robot 3 is equal to or greater than the third threshold value Th3, the stop command unit 43 quickly stops the robot 3.

Figure 14:
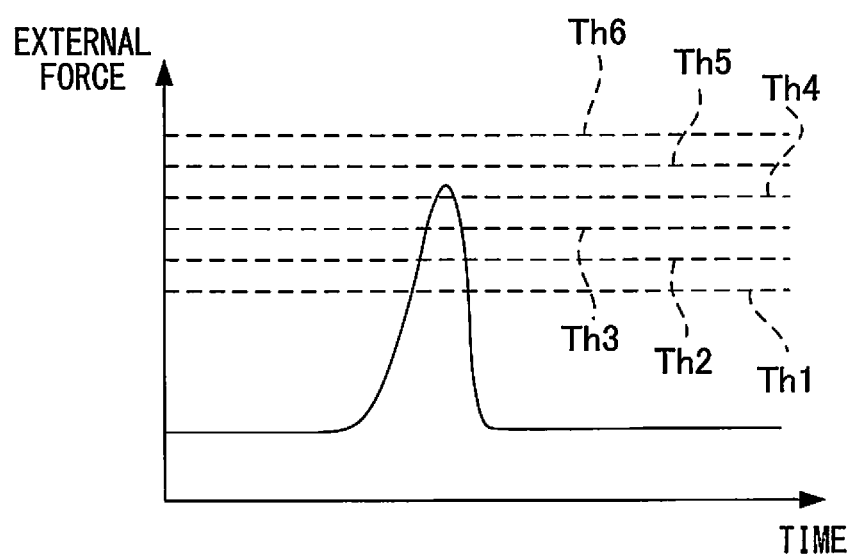
FIG. 14 is a graph illustrating an example when a physical quantity detected by a detection unit is external force in a first modification.

In another embodiment, the physical quantity may also be compared with three or more threshold values, in order to control the stop operation of the robot 3 in a stepwise manner. FIG. 14 is a graph for explaining a modification in which the above concept is applied to the first embodiment. In FIG. 14, first to sixth threshold values Th1 to Th6 are indicated by dashed lines. The stop command unit 43 performs the stop process in a stepwise manner, depending on a range defined between two threshold values, in which the physical quantity detected by the detection unit 42, i.e. the external force in this case, is included. For example, when the external force is included in a range between the fourth threshold value Th4 and the fifth threshold value Th5, the control device 4 selectively performs a stop method so as to stop the robot 3 within a shorter period of time than the case in which the external force is included in a range between the third threshold value Th3 and the fourth threshold value Th4. Accordingly, the command creation unit 41 creates a stop command so as to stop the robot 3 in a shorter period of time, as the external force detected by the detection unit 42 increases, according to a signal transmitted from the stop command unit 43.

Figure 15A:
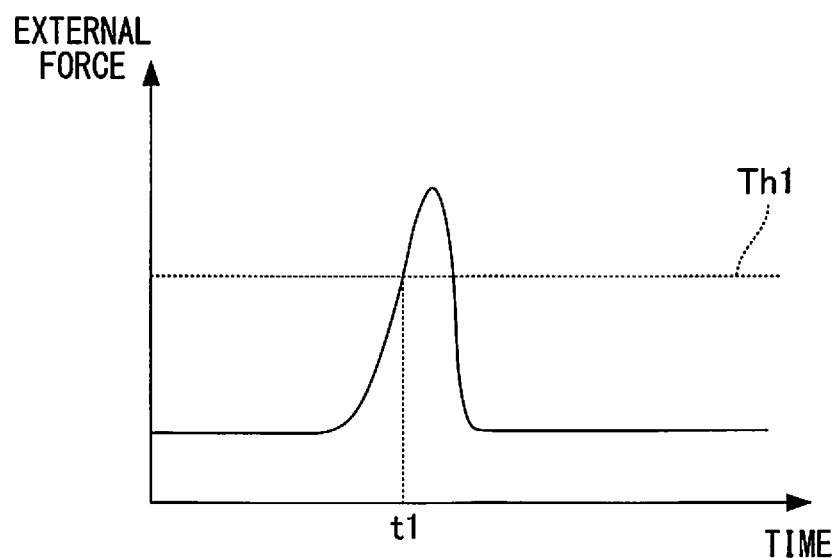
FIG. 15A is a graph illustrating an example when a first physical quantity detected by a detection unit is external force in a second modification.
Figure 15B:
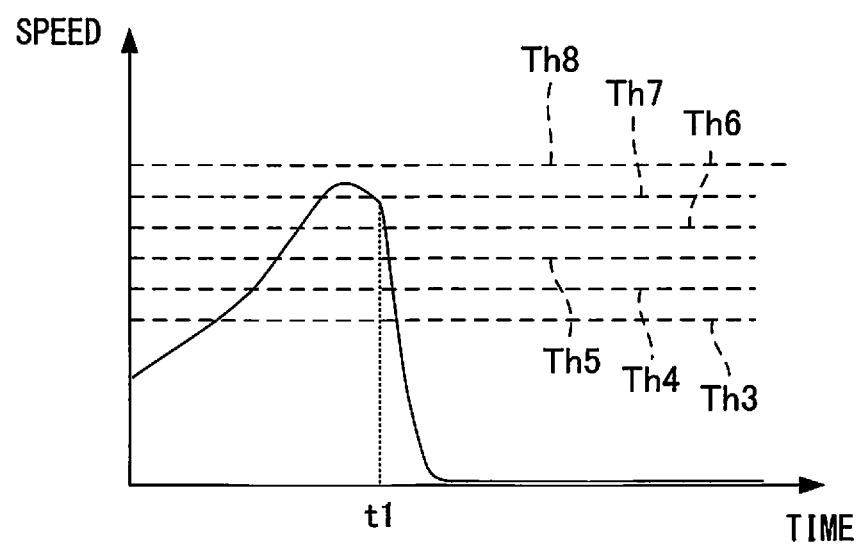
FIG. 15B is a graph illustrating an example when a second physical quantity detected by a detection unit is a speed of a robot in a second modification.

FIG. 15A and FIG. 15B are graphs for explaining a modification in which the concept described above with reference to FIG. 14 is applied to the second embodiment. In the illustrated example, the first physical quantity detected by the first detection unit 42a (see FIG. 6) is external force acting on the robot 3, and the second physical quantity detected by the second detection unit 42b is the speed of the robot 3. When the external force detected by the first detection unit 42a is equal to or greater than the first threshold value Th1, the stop command unit 43 transmits a signal to the command creation unit 41, depending on which threshold the speed of the robot 3 has exceeded among third to eighth threshold values Th3 to Th8. The command creation unit 41 creates a stop command for stopping the robot 3 in a shorter period of time in a stepwise manner as the speed of the robot 3 increases, according to the signal transmitted from the stop command unit 43.

Effect of the Invention

In accordance with the human-collaborative robot system according to the present invention, one of stop methods having different stoppage times is selectively applied in order to stop the robot, on the basis of physical quantities that are changed, depending on contact force when a robot comes in contact with an external environment. Accordingly, when the danger to a worker around the robot is severe, the robot is quickly stopped and, when the danger is less severe, the robot is slowly stopped. In this way, a human-collaborative robot system which allows slow stop to give a sense of safety to a worker while ensuring the safety of a robot and an external environment can be provided.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

The invention claimed is:

1. A human-collaborative robot system in which a robot and a human share a working space, comprising:
 a detection unit configured to directly or indirectly detect a physical quantity which is changed in response to contact force applied to the robot when the robot comes in contact with an external environment; and
 a stop command unit configured to compare the physical quantity detected by the detection unit with a first threshold value and a second threshold value greater than the first threshold value, stop the robot according to a predetermined stop method when the physical quantity is equal to or greater than the first threshold value and is smaller than the second threshold value, and stop the robot in a shorter period of time as compared with the predetermined stop method when the physical quantity is equal to or greater than the second threshold value.

2. The human-collaborative robot system according to claim 1, wherein the physical quantity is force or torque applied to the robot from the external environment.

3. The human-collaborative robot system according to claim 1, wherein the physical quantity is a differential value of force or torque applied to the robot from the external environment with respect to time.

4. The human-collaborative robot system according to claim 1, wherein the physical quantity is an amplitude of vibration of force or of torque at a certain frequency applied from the external environment.

5. A human-collaborative robot system in which a robot and a human share a working space, comprising:
 a first detection unit configured to directly or indirectly detect a first physical quantity which is changed in response to contact force applied to the robot when the robot comes in contact with an external environment;
 a second detection unit configured to directly or indirectly detect a second physical quantity which is changed in response to the contact force applied to the robot when the robot comes in contact with the external environment; and
 a stop command unit configured to compare the first physical quantity detected by the first detection unit with a first threshold value, compare the second physical quantity detected by the second detection unit with a third threshold value, stop the robot according to a predetermined stop method when the first physical quantity is equal to or greater than the first threshold value and the second physical quantity is smaller than the third threshold value, and stop the robot in a shorter period of time as compared with the predetermined stop method when the first physical quantity is equal to or greater than the first threshold value and the second physical quantity is equal to or greater than the third threshold value.

6. The human-collaborative robot system according to claim 5, wherein the first physical quantity is force or torque applied to the robot from the external environment, and the second physical quantity is a differential value of force or torque applied to the robot from the external environment with respect to time.

7. The human-collaborative robot system according to claim 5, wherein the first physical quantity is force or torque applied to the robot from the external environment, and the second physical quantity is an amplitude of vibration of force or torque at a certain frequency applied from the external environment.

8. The human-collaborative robot system according to claim 5, wherein the first physical quantity is force or torque applied to the robot from the external environment, and the second physical quantity is a speed of the robot.

9. The human-collaborative robot system according to claim 5, wherein the first physical quantity is a differential value of force or torque applied to the robot from the external environment with respect to time, and the second physical quantity is force or torque applied to the robot from the external environment.

10. The human-collaborative robot system according to claim 5, wherein the first physical quantity is a differential value of force or torque applied to the robot from the external environment with respect to time, and the second physical quantity is a speed of the robot.

11. The human-collaborative robot system according to claim 5, wherein the first physical quantity is an amplitude of vibration of force or torque at a certain frequency applied from the external environment, and the second physical quantity is force or torque applied to the robot from the external environment.

12. The human-collaborative robot system according to claim 5, wherein the first physical quantity is an amplitude of vibration of force or torque at a certain frequency applied from the external environment, and the second physical quantity is a speed of the robot.

* * * * *